Nov. 7, 1961    J. L. MAHER    3,007,543
PROCESS AND APPARATUS FOR RECOVERING
HYDROCARBONS FROM GAS STREAMS
Filed April 20, 1960    4 Sheets-Sheet 1

INVENTOR.
JOSEPH L. MAHER
BY Arthur L Wade
ATTORNEY

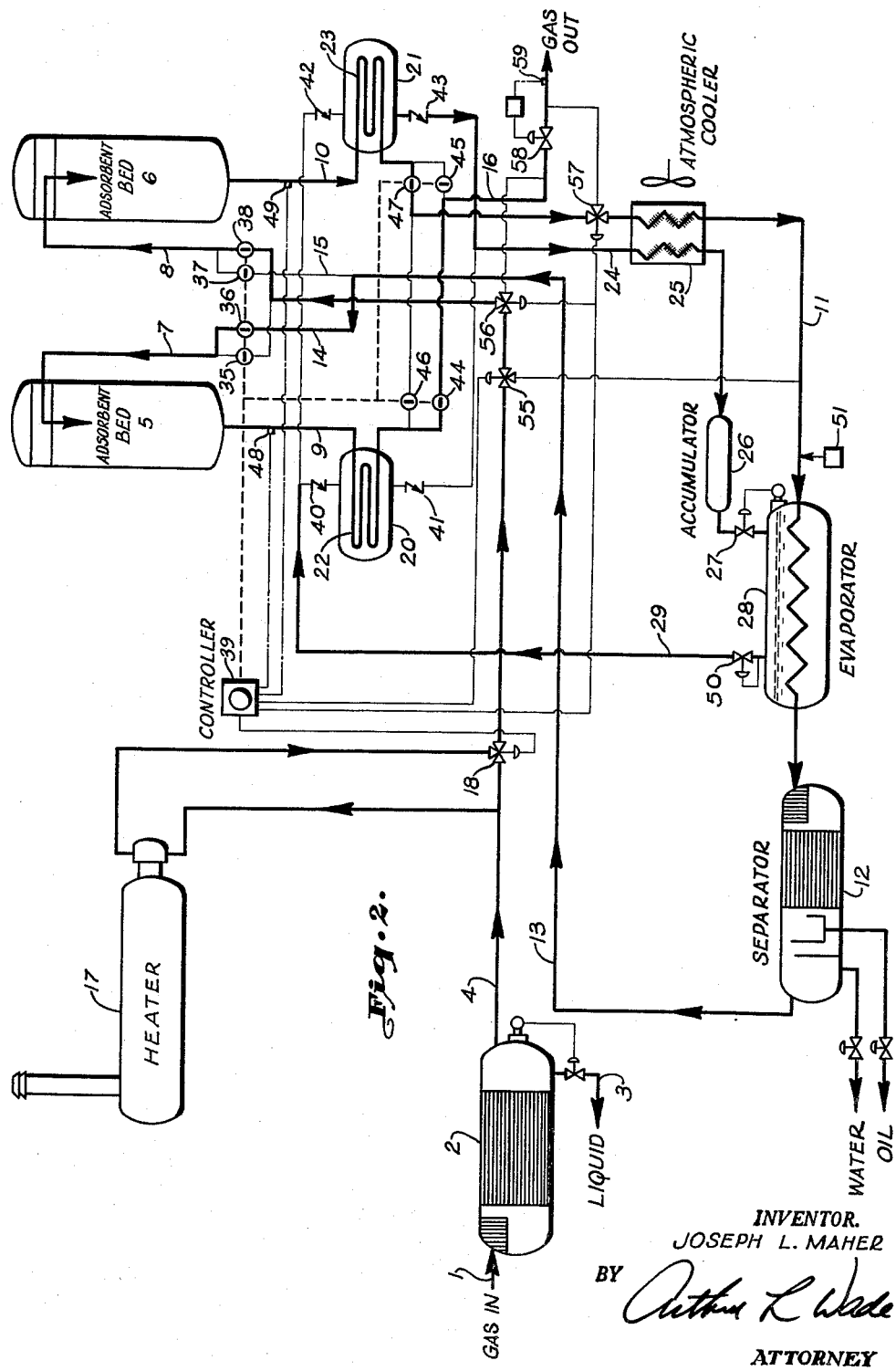

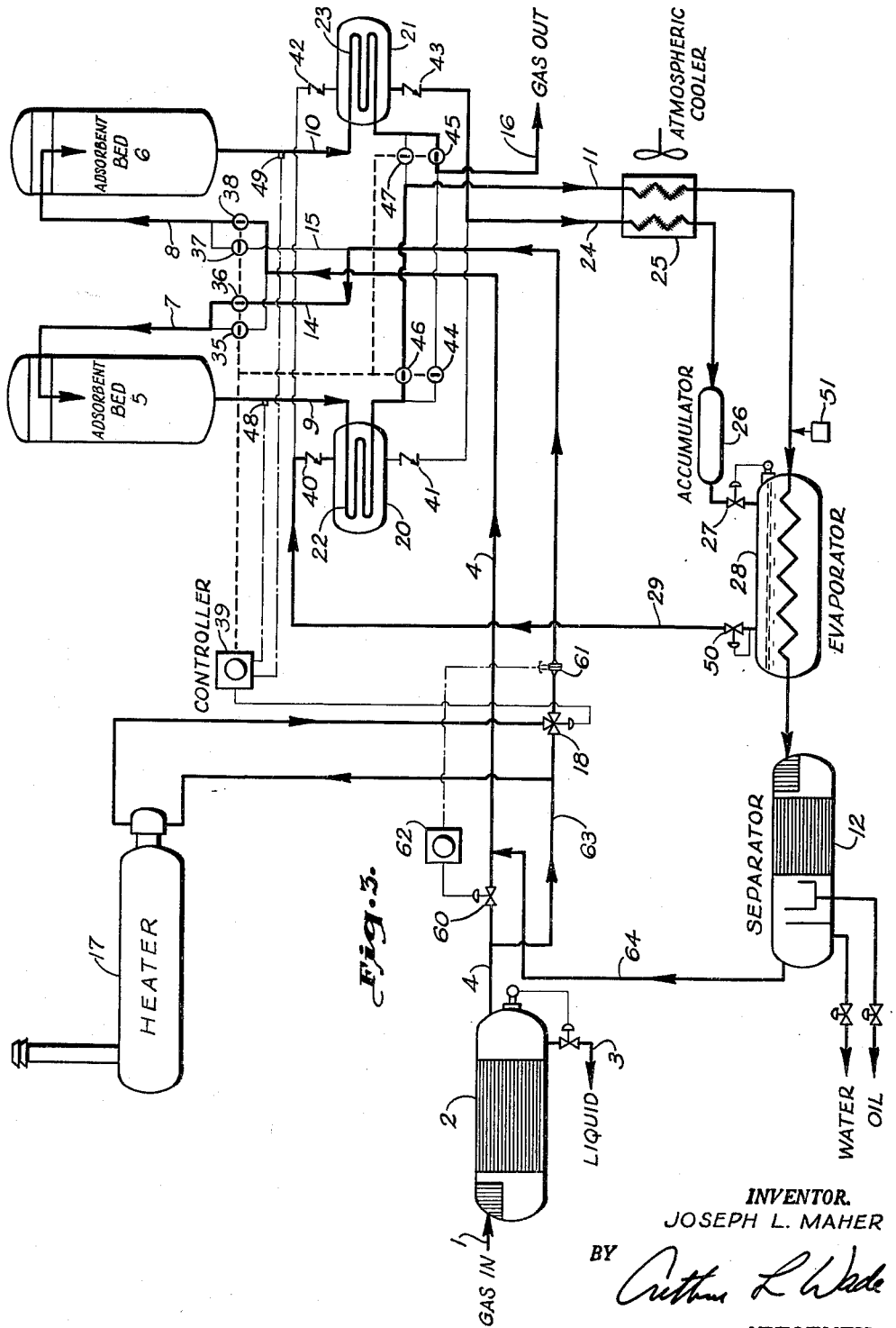

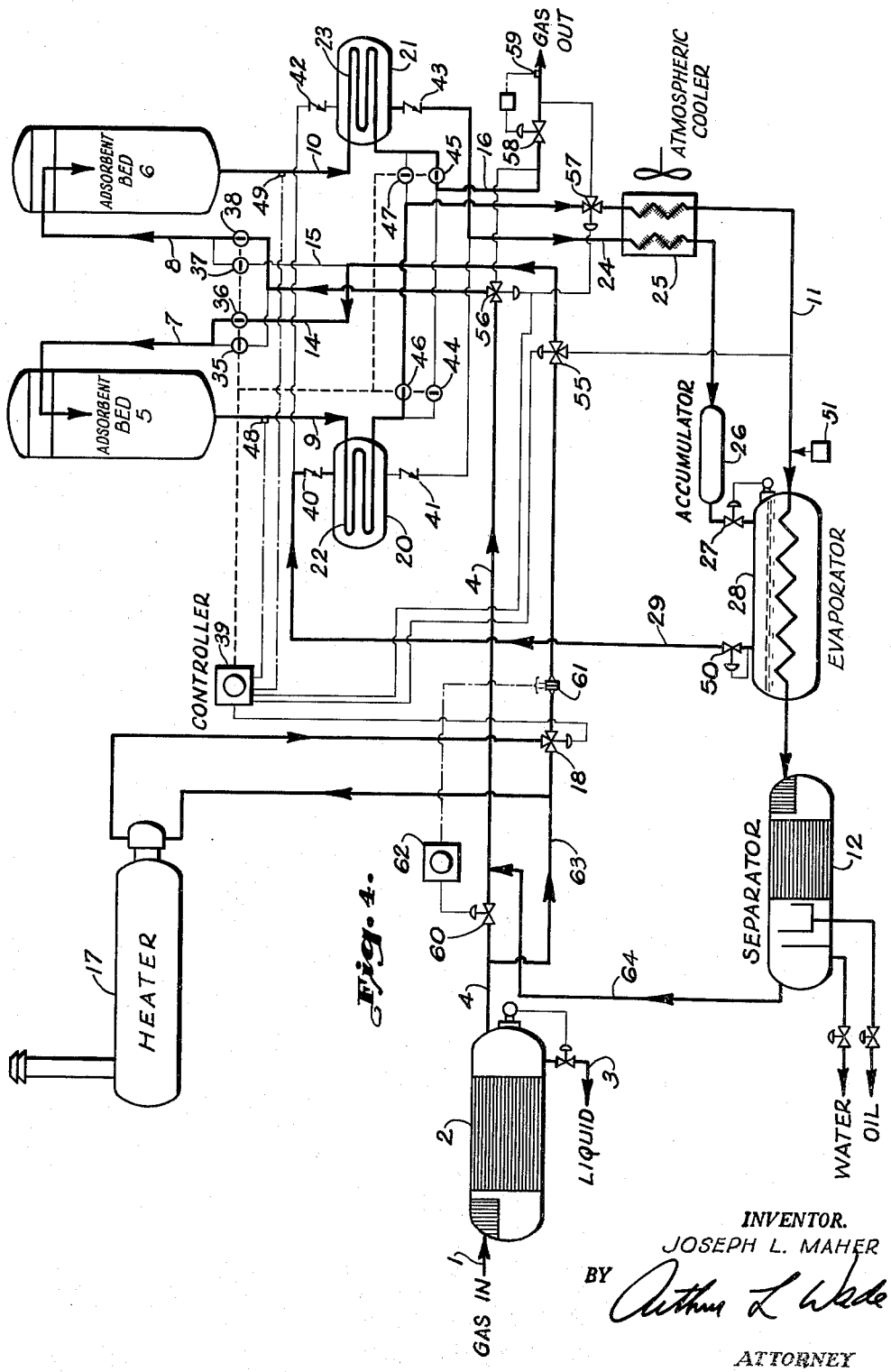

United States Patent Office 3,007,543
Patented Nov. 7, 1961

3,007,543
PROCESS AND APPARATUS FOR RECOVERING HYDROCARBONS FROM GAS STREAMS
Joseph L. Maher, Tulsa, Okla., assignor to National Tank Company, Tulsa, Okla., a corporation of Nevada
Filed Apr. 20, 1960, Ser. No. 23,400
7 Claims. (Cl. 183—4.7)

This invention relates to the dehydration of gas and the recovery of condensable hydrocarbons from the gas. More specifically, the invention relates to control of the contact temperature between the gas stream processed and adsorbents which adsorb water and hydrocarbons from natural gas.

In disclosing this invention, the flow of gas to be processed will be designated the flow, or main, stream. The flow stream of natural gas from a wellhead is always saturated, or partially saturated, with moisture in accordance with its origin, pressure and temperature. Should the gas be transmitted with this moisture in it, condensation will result, leading to severe corrosion of the metal pipe line through which it is transmitted. Further, there is the danger of this moisture at lower temperatures forming hydrates which will clog the pipe lines and valves.

To eliminate the moisture problem, it is common practice to conduct the wet gas through large beds of adsorbent material. Using at least two beds, it is possible to have a continuous gas transmission through adsorbent by alternately directing the flow through a plurality of beds. As each bed is saturated with moisture, it is reactivated with a heated gas. This gas could be the air itself, but is usually a portion of the processed gas.

Relatively more attention is now being given to the fact that main streams are saturated, or partially saturated, with pentanes and heavier hydrocarbons in quantities of sufficient volume to be economical, and these can be removed from the main stream by the adsorbent beds as a separate source of revenue. Removal of both the condensable hydrocarbons and water from natural gas, prior to or during transmission, must be carried out efficiently and economically, to justify the expense of recovering this product.

It has been common practice to remove the liquefiable water and hydrocarbons from saturated adsorbent with a split-off portion of the main stream gas carried in a separate circuit or gas which is recycled in a separate circuit communicated with the main stream. Regardless of its source, the reactivation stream is passed through a heating means to elevate its temperature and then passed through the bed to vaporize the water and hydrocarbon with which it is saturated. The reactivation stream is then cooled in the most economical manner available. The atmosphere, water and other gas available have been used to reduce the temperature of the reactivation stream. The reactivation stream is then passed through a separation system from which the condensed water and hydrocarbons are removed as separate liquid phases. In the case of the split-off system, the gaseous portion of reactivation stream is usually returned to the main stream at a point where the main stream goes into the adsorption step. In the closed cycle types of regeneration circuits, the relatively small reactivation stream is recycled through the bed. The regenerated bed which has been heated is then cooled in order for it to be able to adsorb the products of the stream.

There is also a system using the split-off portion of the main stream as a regenerating agent which is commonly referred to as the open-cycle. The material vaporized from the regenerated bed with the main stream portion is condensed by any agent available to cool this stream portion before the remaining gaseous phase of the portion is returned to the main stream. Generally, it is not economical to cool the open-cycle regeneration stream to the main stream-bed contact temperature. Therefore, a cyclic dead-load of recoverable material is shifted between the beds.

The closed systems of regeneration improve recovery by recycling the regenerating gas to build up its saturation level. The dead load of the beds in these closed systems is then only that amount of condensables in the relatively small volume of the recycled regeneration circuit. The open-cycle may approach the effectiveness of this closed-cycle by cooling the regeneration stream until it is in substantial equilibrium with the main flow stream, but both cycles are limited by the contact temperature of the main stream and the bed.

The adsorbing capacity of beds of adsorbent is directly dependent upon the shifting dead load of regeneration and the contact temperature between the bed material and processed stream. The closed-cycle, or cooled open-cycle, reduces the shifting dead load of the regeneration circuit on the beds. Therefore, in both these systems the contact temperature becomes the limiting factor of recovery. It is also true that the higher the temperature of the processed stream, the less water and hydrocarbons will be adsorbed per unit of bed. This temperature of the main stream brought to the systems has been controlled with cooling towers in the summer and heating in the winter. However, this approach to the problem of contact temperature control has been expensive in initial cost, operation and maintenance.

A principal object of the present invention is to control the contact temperature between the main stream and an adsorbent bed with the heat energy of the regeneration stream.

Another object is to increase condensation in the regeneration stream by heat energy extracted from the regeneration stream.

Another object is to use the entire main stream for regeneration of the bed of adsorbent, and then reduce its temperature before processing the stream with a second bed of adsorbent.

Another object is to use the entire main stream for regeneration of adsorbent and then convert heat energy from it into a refrigerating effect with which to reduce the contact temperature.

The present invention contemplates a refrigeration generating system extracting heat from the regeneration stream of an adsorbent system which removes water and recovers hydrocarbons from the gas stream. The refrigeration system is then applied to reduce the contact temperature of the main stream and the processing bed of adsorbent.

The invention further contemplates heating the complete main stream high enough to regenerate a first bed of adsorbent. The regenerating main stream is then cooled before it is passed through a second bed of adsorbent for completion of the processing removal of water and hydrocarbons.

The invention further contemplates heating the complete main stream high enough to regenerate a first bed of adsorbent. A portion of the heat of the regenerating main stream is then applied to compress refrigerant in a refrigerating system. The refrigerant is then liquefied. The liquid refrigerant is then vaporized as it absorbs heat from the regenerating main stream and thereby condenses water and hydrocarbons from the main stream and reduces the remaining gaseous phase in temperature. The cooled gaseous phase of the main stream is then passed to a second bed to remove additional water and hydrocarbons.

Other objects, advantages and features of this invention will become apparent to one skilled in the art upon consideration of the written specification, appended claims, and attached drawings wherein:

FIG. 2 is a diagrammatic flow sheet of the FIG. 1 type of refrigerated hydrocarbon recovery system utilizing processed gas to cool regenerated beds of adsorbent;

FIG. 3 is a flow sheet of an open-cycle hydrocarbon recovery system using an artificial refrigeration cycle to cool its regeneration circuit; and FIG. 4 is a flow sheet of the system of FIG. 3 using tail gas cooling.

The once-through system

Figure 1:
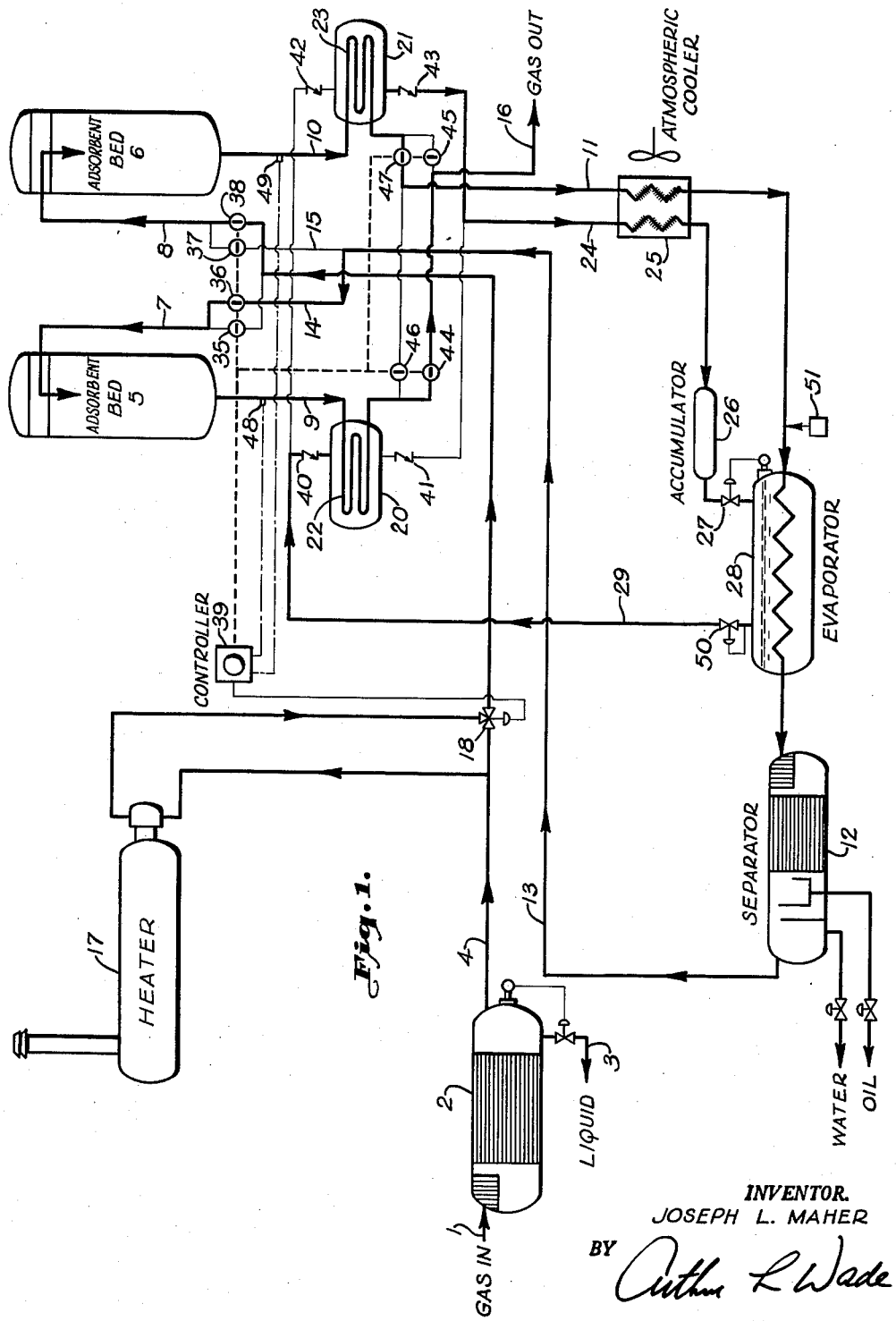
FIG. 1 is a diagrammatic flow sheet of a complete hydrocarbon recovery system embodying the present invention.

In disclosing the present invention, FIG. 1 is unique in the flow pattern for the main stream. In general, the main stream is processed by exposure to beds of dry adsorbent for the removal of water and the recovery of hydrocarbons from the stream. After one of the beds of adsorbent has become saturated, it is regenerated by the main stream. Conduit 1 is illustrated as bringing the main stream into the process. A knockout 2, or liquid separator, receives the main stream and removes free liquids through conduit 3. Conduit 4 removes the gaseous phase of the main stream from knockout 2 and passes the main stream alternately into tower 5 and tower 6.

The alternate flow through towers 5 and 6 is made possible by proper valving to connect branch 7, or branch 8, to conduit 4. A heavy-line drawing has been utilized to indicate the main stream as passing from conduit 4 into branch conduit 8 so that initial contact of the main stream is made with the adsorbent bed in tower 6.

Conduits 9 and 10 remove the main stream from tower 5 or 6 to common conduit 11 or pass the stream out of the process. Conduit 11 passes the main stream into a three-phase separator 12. The gaseous phase of this stream is removed through conduit 13 which is divided into branches 14 and 15. Branches 14 and 15 connect to branches 7 and 8. Again, heavy line drawing has been utilized to illustrate that while the main stream of conduit 4 is directed into tower 6, the main stream of conduit 13 is concomitantly directed into tower 5. From the adsorbent bed in tower 5, the main stream is passed into conduit 9 and out of the process through conduit 16.

Returning to consider the main stream in conduit 4, heater 17 is illustrated as providing heating over selected periods of time for the complete main stream by the setting of three-way valve 18. Alternately heated and cooled, all of the main stream is caused to function as a regeneration agent for the beds of adsorbent in towers 5 and 6. When heated, the entire main stream vaporizes water and hydrocarbons adsorbed by the beds, passing these products into separator 12 for removal and recovery of the condensed water and liquefiable hydrocarbons. When heater 17 is by-passed, the entire main stream is used to cool each regenerated bed so it may be returned to adsorptive service.

The adsorptive service of the beds is applied to the main stream of conduit 13 as this stream leaves separator 12. The bed of tower 5 is illustrated as adsorbing products from the main stream. The main stream leaving the bed of tower 5 has had its water and liquefiable hydrocarbon content reduced to a desired level and may be sent to a point of use with conduit 16.

The function of the system is quite clear. All of the main stream is heated so that it may be initially used to regenerate a first tower of adsorbent. As the adsorbed water and hydrocarbons are removed from the first tower with the regenerating main steam, cooling means are utilized to reduce the temperature of the main stream until condensation of water and hydrocarbons takes place. The condensate is removed and the cooled gaseous phase remaining is contacted by the regenerated bed of adsorbent in a second tower before the gas is passed out of the process. This system does not employ either a side stream nor one of the closed circuits for regeneration. In this one-through flow of the main stream, the main stream itself is heated and cooled at the proper times, to carry out the complete process of delivering gas to conduit 16, stripped of its water and recoverable liquid hydrocarbons.

Waste heat conservation

In common with all the disclosure in which the present invention is embodied, structure is disclosed for converting heat in the regeneration stream, as it leaves the adsorbent bed being regenerated, into a refrigerating effect for reducing the temperature of the regeneration stream. A separate circuit can be traced for accomplishing this work of refrigeration.

The dominant apparatus of the refrigeration system is illustrated at 20 and 21, as two vessels, each having beds of adsorbent therein. Embedded in the adsorbent of vessels 20 and 21 are heat exchange coils 22 and 23. Coil 22 receives the gas of conduit 9 and coil 23 receives the gas of conduit 10. These coils are embedded in the desiccant to act as heat exchange structure to alternately raise and lower the temperature of the adsorbent beds in the vessels.

The output of coils 22 and 23 are alternately communicated to conduits 11 and 16. In this manner, the main streams of conduits 4 and 13 are alternately passed through tower 5-coil 20 and tower 6-coil 23.

The general plan for operating the refrigerating system is to alternately heat and cool the adsorbent beds in vessels 20 and 21. Vaporized refrigerant is drawn into the cooler of the beds for adsorption and collected in the pores of the adsorbent. The heat of adsorption is continually drawn-off by the heat exchange coil in the bed. The bed being heated has already been saturated with the vaporized refrigerant. When the saturated bed is heated, the collected refrigerant is driven from the bed as a vapor at an elevated pressure. Thus, one bed is adsorbing refrigerant while the other bed is expelling refrigerant. Alternately heated and cooled, the beds act as mechanical compressors in drawing in vaporized refrigerant at one pressure and expelling it as a vapor at a higher pressure.

The refrigerant expelled from vessels 20 and 21 is passed into conduit 24. An atmospheric cooler 25 represents one means of reducing the temperature of the pressurized refrigerant in conduit 24. In conduit 24, the pressurized refrigerant is condensed and accumulates in vessel 26 as a liquid.

From accumulator 26, the liquefied refrigerant is valved by 27 into evaporator 28. In evaporator 28, the refrigerant is heat exchanged with the main stream in conduit 11, lowering the temperature of the regeneration stream until water and hydrocarbons condense. As the refrigerant absorbs heat from the regeneration stream of conduit 11, it vaporizes and is passed into conduit 29. From conduit 29, the refrigerant vapors are alternately drawn into the beds of vessels 20 and 21 for adsorption by the beds in these vessels. Check valves in the conduits to the beds, connecting with conduit 29, control the vapor flow so that the refrigerant moves from conduit 29, through either vessel 20 or 21, into conduit 24.

As long as the beds of adsorbent in vessels 20 and 21 are alternately heated and cooled, the refrigeration process continues, producing the lower temperature necessary to reduce the temperature of the stream in conduit 11. The heat energy of the regeneration stream flowing out of the adsorbent beds is thereby converted to a refrigerating effect for reducing the temperature of the regeneration stream. The result, in both systems disclosed is control of the contact temperature between the processed stream and the bed of adsorbent and increase of condensation within the regeneration stream.

Valve switching control

Tower valves 35—38 must be properly controlled to alternate the connection of conduits 4 and 13 to towers 5 and 6. A control instrument for this purpose is indicated at 39. Three-way valve 18 must be controlled in coordination with the actuation of the tower valves in order to establish a proper heating period for each tower, followed by a proper cooling period with heater 17 by-passed.

The refrigeration circuit operates continuously, and automatically, as long as the beds of vessels 20 and 21 are alternately heated and cooled by the output gas streams from towers 5 and 6. Check valves 40—43 are arranged to insure a continuous flow from conduit 29 to conduit 24 through either check valves 40, 41 or 42, 43.

Processed gas must continuously flow from conduit 13 to conduit 16. Valves 44, 45 are coordinated with valves 36, 37 to establish this flow. At the same time, the regeneration gas flow from conduit 4, through valve 35 or 38, must be directed to conduit 11 in order to be cooled by atmospheric cooler 25 and evaporator 28 before delivery to separator 12. Valves 46 and 47 are coordinated with valves 35 and 18 to insure this flow from conduit 4 to conduit 11.

All of these valves may be controlled on a time-cycle basis at controller 39. The temperature variation of the gas output of towers 5 and 6 may be sensed by temperature responsive elements 48 and 49. These temperatures may be used to modify the time-cycle basis for actuating three-way valve 18, as well as the valves 35—38 and 44—47.

Over-all operation

The pattern of flow diversion through towers 5 and 6 is simple and readily understood. In FIG. 1, the main stream flow through conduit 4 is sent through the bed of tower 6, heated by heater 17 to a temperature which will vaporize the water and recoverable hydrocarbons from the adsorbent in tower 6. Leaving tower 6, by way of conduit 10, the main stream heats the refrigeration adsorbent bed in vessel 21, is further cooled in atmospheric cooler 25 and given a final cooling in evaporator 28. The main stream is then delivered to separator 12 where the condensed water and hydrocarbons are separated, the remaining gaseous phase of the stream being passed through conduit 13. The cooled gaseous stream in conduit 13 is then passed through tower 5 where its remaining water and recoverable hydrocarbons are adsorbed. From tower 5, the processed gas is delivered to conduit 9 to pass through coils 22 in vessel 20 to cool the refrigeration adsorbent before passing out of the process by way of conduit 16.

After the main stream of conduit 4 has vaporized the water and hydrocarbons from tower 6, three-way valve 18 is actuated to by-pass heater 17 by the main stream in conduit 4 so this stream will cool the regenerated adsorbent in tower 6. When the bed in tower 6 has been sufficiently cooled for adsorption service, tower valves 35—38 are actuated to divert the main stream in conduit 4 through tower 5 while the main stream in conduit 13 is passed through tower 6. Valves 44—47 are simultaneously actuated to direct the main stream of conduit 13, from tower 6, to the output conduit 16 while the regeneration stream in conduit 4 is heated and passed through tower 5 to vaporize water and hydrocarbons from the bed therein. The output of tower 5 is then delivered to conduit 11 for condensation of the material removed from the adsorbent in tower 5.

The refrigeration adsorbent of vessels 20 and 21 are alternately exposed to the heating and cooling of the streams of conduits 9 and 10 from the towers 5 and 6. As the refrigeration adsorbent of each vessel is alternately heated and cooled it draws vaporized refrigerant from conduit 29 and delivers it at a higher pressure to conduit 24.

Control of refrigeration evaporator 28

The liquid refrigerant accumulated in vessel 26 is valved into evaporator 28 to enable evaporator 28 to operate at the desired pressure for cooling the regeneration stream. It is desirable to maintain a body of refrigerant in a liquid state within evaporator 28. The heat transfer rate from the boiling refrigerant liquid is greater than from the vaporized refrigerant to the gas in conduit 11.

Various ways of controlling the admission of refrigerant to evaporator 28 are available. In general, valve 27 may be modulated from the level of liquid in the evaporator vessel 28. Also, the pressure of the gaseous phase in evaporator 28 may be used to control a valve 50 in conduit 29. A third way to control evaporator 28 is by superheat temperature of the vaporized refrigerant in conduit 29. Any one, or a combination of these segments of control may be utilized.

Hydrate control

In general, it is desirable to reduce the temperature of the stream in conduit 11 as low as possible. The lower the temperature of this stream, the more water and hydrocarbons will be condensed therefrom. On the other hand, there is a hydrate point for the gas in conduit 11. As this point is approached, it may be desirable to control just above the temperature at which hydrates will begin to form. If it is desirable to chill the stream below the hydrate point, it is generally desirable to inhibit the formation of hydrates by some inhibitor. A supply from which glycol, or other inhibitor is injected into conduit 11 is indicated at 51.

Operation near the hydrate point would be possible under several control systems. A control of valve 50 could determine the temperature level of the conduit 11. A temperature responsive element in conduit 11, between evaporator 28 and separator 12 could be used to regulate valve 50 to adjust the pressure in evaporator 28 so conduit 11 would be cooled to just above the hydrate-forming temperature.

Tail gas cooling

FIG. 2 has been established to illustrate how the pre-loading of the regenerated adsorbent bed by the main stream could be avoided. After the heated main stream has vaporized the water and hydrocarbons from the bed being regenerated, the processed stream from the other bed could be shunted through the hot regenerated bed to bring it back to service temperature.

This cooling arrangement must not interrupt the flow of the main stream to the adsorbing tower or the delivery of processed gas from the adsorbing tower. Further, the total rise in temperature of the processed tail gas must be regulated to avoid injury to downstream equipment.

The general plan of the FIG. 2 arrangement is the same as that of FIG. 1. Additionally, valve 55 is provided in conduit 4 to shunt the main stream directly into conduit 11 when valve 18 is actuated to by-pass the main stream around heater 17. Again, coordinating control mechanism is mounted in controller 39 for this result.

At the time main stream conduit 4 is directly connected to main stream conduit 11, valves 56 and 57 connect the processed gas of conduit 16 to the tower being cooled across valve 58. Thus, processed, or tail, gas is substituted for the main stream conduit 4 gas in the hot regenerated bed. The processed gas, being leaner with respect to water and hydrocarbons than the main stream, will not preload the cooling bed with these products and thereby decrease the adsorptive capacity of the bed from that source. As with valve 55, valves 56 and 57 are coordinated through the control center in 39.

The downstream temperature of the processed stream must always be kept under control. Therefore, a temperature responsive element 59 is indicated as controlling the position of valve 58. As the cooled bed decreases in temperature, valve 58 will be positioned to increase the flow of tail gas through the cooled bed.

It is to be understood that a third tower could be used if desirable to have tail gas continuously available and working in cooling a regenerated bed. The system of valves 56, 57 and 58 could be reduced to simply the one valve 58. However, the tower valves and manifold necessary to cycle all three towers in the separated heating, cooling and adsorbing circuits might become so complex as to render the FIG. 2 scheme the more sound, economically and engineering-wise.

Open cycle operation

The split-off system can be easily adapted to utilize the waste heat conservation plan of FIGS. 1 and 2. FIG. 3 illustrates how the adaptation can take place.

Valve 60 is mounted in conduit 4 to establish a controlled differential in the regeneration circuit. The flow of gas in the regeneration circuit is a known function of the differential pressure across orifice 61. This flow signal is placed in the open-cycle regeneration circuit downstream of the valve 18 so the flowing temperature variations in the circuit will properly modulate valve 60, through control center 62 to maintain the flow through the regeneration circuit which will properly regenerate the beds.

The FIG. 3 arrangement is fundamentally different from the once-through arrangement of FIGS. 1 and 2 in contacting the beds for adsorption and in regenerating the beds. The main stream in conduit 4 is taken directly to the bed on service and removed from the process through conduit 16. The regeneration stream is defined as it flows in conduit 63, through valve 18 and orifice 61. Tower valves 36, 37 direct this regeneration stream into either tower 5 or tower 6. Tower valves 46, 47 direct the regeneration stream from the towers into conduit 11 where it is cooled to condense water and hydrocarbons into separator 12. Conduit 63 removes the gaseous phase from separator 12 and conducts it back into conduit 4, downstream of differential control valve 60.

The operation of an open-cycle system is readily understood. The processed main stream goes directly to the towers where its water and hydrocarbons are adsorbed. The split-off portion of the main stream, used as to regenerate the beds in the towers, is returned to the main stream ahead of the towers. If the regeneration stream temperature is brought into substantial equality with the temperature of the main stream before rejoining it from the separator 12, the efficiency of the open-cycle system will compare favorably with the closed-cycle. The cooling potential for conduit 11 becomes a critical factor in approaching this equality.

Atmospheric cooler 25 represents so-called natural cooling available for conduit 11. However, the artificial refrigeration circuit of FIG. 1 is also readily incorporated to salvage heat energy from towers 5 and 6 which would otherwise be dissipated without performing useful work.

Refrigeration adsorbent beds are exposed to the cyclic cooling and heating of conduits 9 and 10. The variation in heat levels on each adsorbent bed causes the bed to adsorb refrigerant at one pressure and expel the refrigerant at a higher pressure level. The result is to cool conduit 11 in evaporator 28 to the limit of the capacity of the refrigeration cycle having the heat level variations from towers 5 and 6 as an energy source. If the system results in bringing the temperature of conduit 63 below that of the stream in conduit 4, the contact temperature between the main stream and the beds is reduced in some degree. The recovery efficiency of this artificially refrigerated open-cycle will then be comparable to the closed cycle.

Tail gas cooling of refrigerated open cycle

FIG. 4 illustrates both the refrigeration of the open-cycle with the beds of vessels 20 and 21 as well as the use of the processed gas of conduit 16 for cooling the hot, regenerated tower. Valves 55, 56, 57 and 58 of the FIG. 2 system are simply shifted in position.

Valve 58 is controlled from the temperature of conduit 16 with temperature responsive element 59. Valves 56 and 57 receive the conduit 16 gas and pass it through the hot regenerated tower while the regeneration gas of conduit 63 is passed through the cooling equipment and into separator 12. In FIG. 4 the heated regeneration gas is indicated as passing through tower 5 while the main stream gas passes through tower 6. The refrigeration circuit continues to function automatically as the output of the towers is thermally cycled. The contact temperature between the main stream in conduit 4 and the adsorbent beds defines the limit of over-all recovery efficiency by the system.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for removing water vapor and recovering condensable hydrocarbons from natural gas, including,
   a main flow stream of gas containing water to be removed and hydrocarbons to be recovered,
   a first bed of adsorbent material which has been saturated with water and hydrocarbons by adsorption from the main flow stream,
   a heater with which to raise the temperature of main flow stream gas high enough to vaporize the water and hydrocarbons from the first bed when passed through the bed,
   a second bed of adsorbent material saturated with a refrigerant,
   means for heat exchanging the heated regenerating gas from the first bed with the adsorbent material of the second bed in order to compress the refrigerant while vaporizing it,
   means for cooling the compressed and vaporized refrigerant to liquefy it,
   means for expanding the liquefied refrigerant to cool it,
   means for heat exchanging the regenerating gas with the cooled refrigerant to reduce the temperature of the regenerating gas and vaporize the refrigerant,
   a separator receiving the cooled regenerating gas stream and dividing it into its liquid and gaseous phases,
   a third bed of adsorbent material receiving the cooled gaseous phase of the cooled regeneration stream to adsorb water and condensable hydrocarbons therefrom,
   and a fourth bed of adsorbent material receiving the vaporized refrigerant for subsequent compression by the heat of the regenerating gas stream.

2. The process of removing water and hydrocarbons from natural gas, including, heating the entire main flow stream of natural gas to be processed, reactivating a first bed of adsorbent material with the entire main flow stream of natural gas, heating a second bed of adsorbent material with the main stream from the first bed which second bed has adsorbed a vaporized refrigerant, cooling the entire main flow stream of natural gas after it has passed through the first two beds whereby water and hydrocarbons are condensed, adsorbing additional water and hydrocarbons from the cooled main flow stream with a third bed of adsorbent material, cooling a fourth bed of adsorbent material with the cooled main stream from the third bed which fourth bed is exposed to vaporized refrigerant, passing the main flow stream from the process, cooling the refrigerant flowing from the second bed of adsorbent material whereby it condenses, reducing the pressure on the liquefied refrigerant, heat exchanging the main flow stream after it has passed through the first two beds with the cooled refrigerant which vaporizes the refrigerant, and passing the refrigerant vaporized by the main flow stream into the cooling fourth bed of adsorbent material.

3. In a system for removing condensables from a gas stream containing hydrocarbons, including the steps of, heating the entire flowing stream to the degree effective for reactivating adsorbent beds which are capable of adsorbing hydrocarbons from a gas stream brought into direct contact with the beds, flowing the entire heated stream through and into direct contact with a first bed of adsorbent to reactivate the adsorbent, flowing the entire heated stream in indirect contact with a second bed of adsorbent which has adsorbed refrigerant gases to thereby vaporize the refrigerant adsorbed by the bed and lower the temperature of the stream toward the condensate temperature level of hydrocarbons in the stream, periodically interrupting the heating of the entire stream so the stream will cool the reactivated first bed of adsorbent and second bed of adsorbent, removing the condensed liquids from the entire cooled stream, flowing the entire cooled stream through and into direct contact with a third bed of cooled adsorbent to adsorb hydrocarbons from the cooled stream, flowing the entire cooled stream in indirect contact with a fourth bed of adsorbent which has been regenerated of refrigerant gases and cooled and which is again exposed to refrigerant gases to be adsorbed, cooling the vaporized refrigerant regenerated from the second bed of adsorbent to liquefy the refrigerant, cooling the entire stream from the second bed of adsorbent by use of the liquefied refrigerant which vaporizes the refrigerant, and passing the refrigerant vaporized in cooling the entire stream into contact with the fourth bed of adsorbent.

4. In a continuous adsorption system for removing condensables from a high pressure gas stream, a heating system to heat the entire vapor phase of the gas stream high enough to reactivate a first bed of adsorbent with which the heated vapor phase is brought into direct contact, the bed having adsorbed condensable hydrocarbons, a system for bringing the heated vapor from the first bed into indirect contact with a second bed of adsorbent which has previously adsorbed refrigerant, a system for cooling and condensing the vaporized refrigerant desorbed from the second bed and applying the refrigerant to cooling the vapor which had indirect contact with the second adsorbent bed until hydrocarbons are condensed from the cooled vapor, a system for removing and accumulating the liquids condensed from the cooled vapor from the second bed, a system for bringing the vapor phase of the stream of cooled vapor into direct contact with a third bed of adsorbent to adsorb condensable hydrocarbons from the cooled vapor, a system for bringing the cooled vapor from direct contact with the third bed of adsorbent into indirect contact with a fourth bed of adsorbent which bed has been desorbed of refrigerant and which fourth bed is exposed to refrigerant vaporized in cooling the vapor, and means for controlling the heating system to interrupt the heating of the entire vapor phase of the gas stream so the entire stream may be used to cool the reactivated first and second beds of adsorbent.

5. The system of claim 4 including, a preliminary separation stage for the liquid and vapor of the high pressure gas stream.

6. In the removal of water vapor and condensable hydrocarbons from natural gases involving the contact of adsorbent material with a main flow stream of natural gas with resultant adsorption of the water and condensable hydrocarbons by the adsorbent material and subsequent treatment of the adsorbent material with a heated reactivation agent to vaporize and remove the water and condensable hydrocarbons and thereby reactivate the adsorbent material for further contact with the main flow stream, passing the heated reactivation agent from the reactivated adsorbent material into heat exchange with adsorbent material which is saturated with refrigerant to compress the refrigerant while vaporizing it, cooling the compressed and vaporized refrigerant to liquefy it, expanding the liquefied refrigerant to cool it, heat exchanging the regenerating agent with the cooled refrigerant to reduce the temperature of the regenerating agent and vaporize the refrigerant, recovering the hydrocarbons which condense from the cooled reactivation agent, and heat exchanging the adsorbent material from which the refrigerant has been vaporized with the main flow stream from which water and hydrocarbons have been adsorbed by exposing the adsorbent material to refrigerant vaporized by heat exchange with the regenerating agent to resaturate the adsorbent material with refrigerant.

7. Apparatus for removing water and recovering condensable hydrocarbons from natural gas, including, a first bed of adsorbent material which has been saturated with water and hydrocarbons by contact with the main flow stream, a second bed of adsorbent material saturated with a refrigerant, means for heat exchanging heated reactivation agent from the first bed after having flowed therethrough with the adsorbent material of the second bed in order to compress the refrigerant while vaporizing it, means for cooling the compressed and vaporized refrigerant to liquefy it, means for expanding the liquefied refrigerant to cool it, means for heat exchanging the regenerating agent with the cooled refrigerant to reduce the temperature of the regenerating agent and vaporize the refrigerant, a separator receiving the cooled regenerating agent and separating the condensed water and hydrocarbons therefrom, a third bed of adsorbent material contacted by the main flow stream to adsorb water and hydrocarbons therefrom, and a fourth bed of adsorbent material receiving the vaporized refrigerant for subsequent compression by the heat of the regenerating agent and simultaneous heat exchange with the main flow stream from the third bed.

References Cited in the file of this patent

UNITED STATES PATENTS

| | | |
|---|---|---|
| 653,171 | Coleman | July 3, 1900 |
| 1,948,779 | Abbott et al. | Feb. 27, 1934 |
| 1,959,389 | Shoosmith | May 22, 1934 |
| 2,601,009 | Swearingen | June 17, 1952 |
| 2,675,089 | Kahle | Apr. 13, 1954 |